(12) United States Patent
Liu et al.

(10) Patent No.: US 11,815,647 B1
(45) Date of Patent: Nov. 14, 2023

(54) GRAVITY INVERSION METHOD AND SYSTEM BASED ON MESHFREE METHOD

(71) Applicant: Chinese Academy of Geological Sciences, Beijing (CN)

(72) Inventors: Yan Liu, Beijing (CN); Yao Huang, Beijing (CN); Jinmin Hu, Beijing (CN); Yongqian Zhang, Beijing (CN)

(73) Assignee: Chinese Academy of Geological Sciences, Beijing (CN)

(*) Notice: Subject to any disclaimer, the term of this patent is extended or adjusted under 35 U.S.C. 154(b) by 0 days.

(21) Appl. No.: 17/724,571

(22) Filed: Apr. 20, 2022

(51) Int. Cl.
 *G01V 7/06* (2006.01)
 *G01V 11/00* (2006.01)
 *G01V 1/30* (2006.01)

(52) U.S. Cl.
 CPC ............... *G01V 7/06* (2013.01); *G01V 1/301* (2013.01); *G01V 11/002* (2013.01)

(58) Field of Classification Search
 CPC ......... G01V 7/06; G01V 1/301; G01V 11/002
 See application file for complete search history.

(56) References Cited

U.S. PATENT DOCUMENTS

| 10,884,161 B2 * | 1/2021 | Cao ........................... G06T 7/13 |
| 2004/0172199 A1 * | 9/2004 | Chavarria .............. G01V 11/00 |
| | | 702/14 |

FOREIGN PATENT DOCUMENTS

CN 113255230 A * 8/2021 ............. G06F 30/27

* cited by examiner

Primary Examiner — Mischita L Henson
(74) Attorney, Agent, or Firm — Troutman Pepper Hamilton Sanders LLP; Christopher C. Close, Jr.

(57) ABSTRACT

A gravity inversion method and system based on a meshfree method. The method includes: selecting an appropriate method of constructing an approximate function, and forming a hybrid radial basis function; using an appropriate evaluation method to select suitable parameters of the hybrid radial basis function; selecting a construction form of an equation; and weighting a distance norm of the hybrid radial basis function on the basis of the tendency and morphology of an ore body in the prior information; loading known underground density information and constructing an equation set; solving the equation set, and using a coefficient matrix created with an acquired coefficient vector in combination with a global background grid to obtain a global estimated density distribution; loading observation data and performing inversion by using a preconditioned conjugate gradient method (PCGM) with the estimated density distribution as a constraint; and obtaining an underground density distribution and completing the inversion.

3 Claims, 19 Drawing Sheets

GRAVITY INVERSION METHOD AND SYSTEM BASED ON MESHFREE METHOD

TECHNICAL FIELD

The present disclosure relates to the technical field of gravity model inversion, and in particular, to a gravity inversion method and system based on a meshfree method.

BACKGROUND ART

Gravity prospecting is a geophysical method which is critical in various fields such as mineral prospecting, oil and gas prospecting and structural interpretation. Gravity inversion is one of the most important means in processing of gravity prospecting data. In present-day gravity inversion, outstanding methods include a simulated annealing method based on random search, a neural network algorithm, Bayesian inversion based on statistics, a conjugate gradient method based on nonlinear solving, etc. Comparatively, the study on the use of meshfree methods in inversion problems of geophysics is still at its initial stage.

There are numerous meshfree methods that have experienced great development, but their use cases in the field of geophysics are still at the initial stage of development. However, such methods have been applied to various branches of geophysics, indicating that they can well address geophysical problems. For gravity forward and inversion, two-dimensional gravity forward modeling can already be solved by using a meshfree method. This is still no good solution for inversion. The present disclosure may provide an effective solution for the combination of a meshfree method and gravity inversion.

SUMMARY

The technical problem to be solved in the present disclosure is to provide a gravity model inversion method and system based on a meshfree method of a hybrid basis function. A meshfree method of a hybrid basis function is used to estimate a density field of known prior information, and the estimated density field is used as an initial density for inversion. This method can efficiently utilize the prior information, thus improving the accuracy of gravity inversion.

To solve the above technical problem, the present disclosure provides a gravity model inversion method and system based on a meshfree method. Specifically, a hybrid radial basis function formed by using a Multi-Quadric (MQ) radial basis function and a cubic kernel function is used in the present disclosure. An appropriate evaluation method is used to select suitable parameters of the hybrid radial basis function. A degree of freedom and a root-mean-square error are selected for evaluation in this method. A distance norm of the hybrid radial basis function is weighted on the basis of the tendency and morphology of an ore body in the prior information. Known underground density information is loaded and an equation set is constructed by using a meshfree hybrid radial basis function collocation method. Inversion is performed by using a preconditioned conjugate gradient method (PCGM) with the estimated density distribution as a constraint. An underground density distribution is obtained and the inversion is completed.

The hybrid basis function may be used for interpolation of discrete data and has mesh free and dimension independent advantages. Meanwhile, the cubic kernel function is introduced, thereby well avoiding the influence of a too large condition number on the stability of the equation and improving the accuracy.

The present disclosure has the following advantages: the present disclosure provides a gravity inversion method and system based on a meshfree method. The hybrid radial basis function collocation method may be used for efficiently utilizing the prior information, enabling substitution of the known morphology and tendency of an ore body into constraints for the inversion. A radial distance is used a unique variable for calculating the estimated density distribution such that the complexity of calculation can be simplified and the constraints of a physical law can be well met, and the efficiency and accuracy of the inversion can be improved.

BRIEF DESCRIPTION OF THE DRAWINGS

The foregoing description is only an overview of the technical solution of the present disclosure. To understand the technical means of the present disclosure more clearly, the present disclosure will be further explained in detail with reference to the accompanying drawings and specific embodiments.

DETAILED DESCRIPTION OF THE EMBODIMENTS

A preferred embodiment of the present disclosure will be described below with reference to the accompanying drawings. It should be understood that the preferred embodiment described herein is merely used to illustrate and explain the present disclosure and not intended to limit the present disclosure.

I. Selection of Parameters of Radial Basis Function

The radial basis function used herein is an improved approximate function of the Multi-Quadric (MQ) function proposed by Hardy. The specific form of the MQ function is as follows:

$$g_I(x) = \left((\varepsilon r_I)^2 + c^2\right)^{\theta-\frac{3}{2}} \quad (1)$$

where $r_I$ is a distance norm of a calculation point and a node. So far, there is still no uniform effective parameter selection method. For this, it is essential to select and evaluate parameters.

Figure 1:
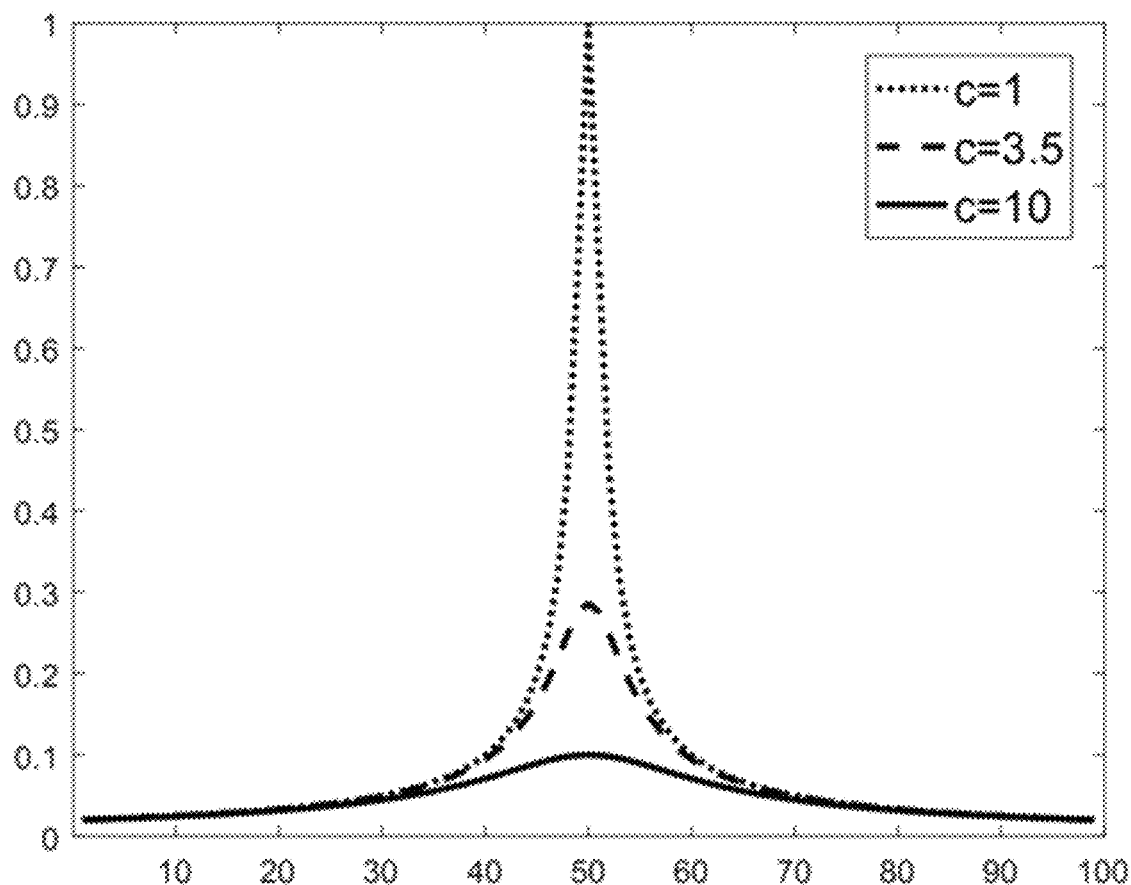
FIG. 1 illustrates the influence of different values of parameter c on the shape of the MQ function.
Figure 2:
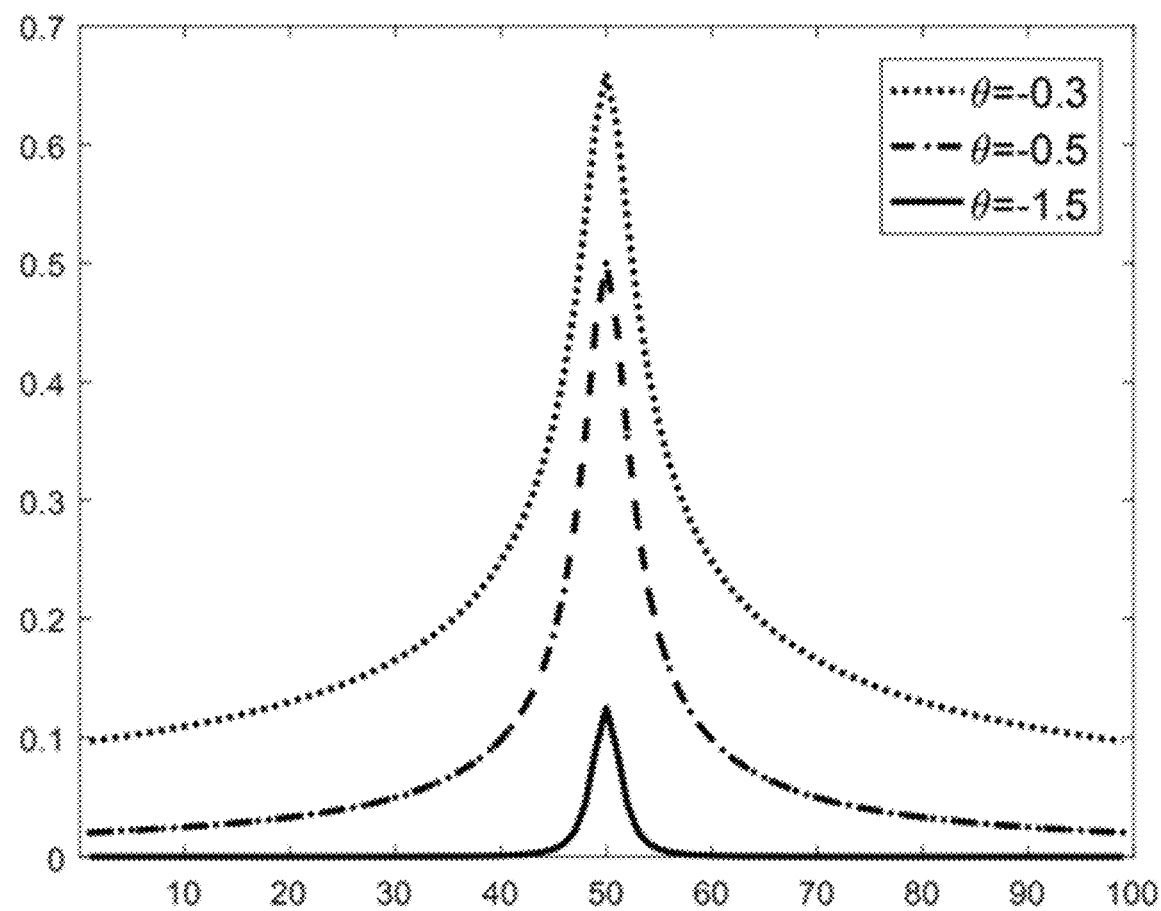
FIG. 2 illustrates the influence of different values of parameter $\theta$ on the shape of the MQ function.
Figure 3:
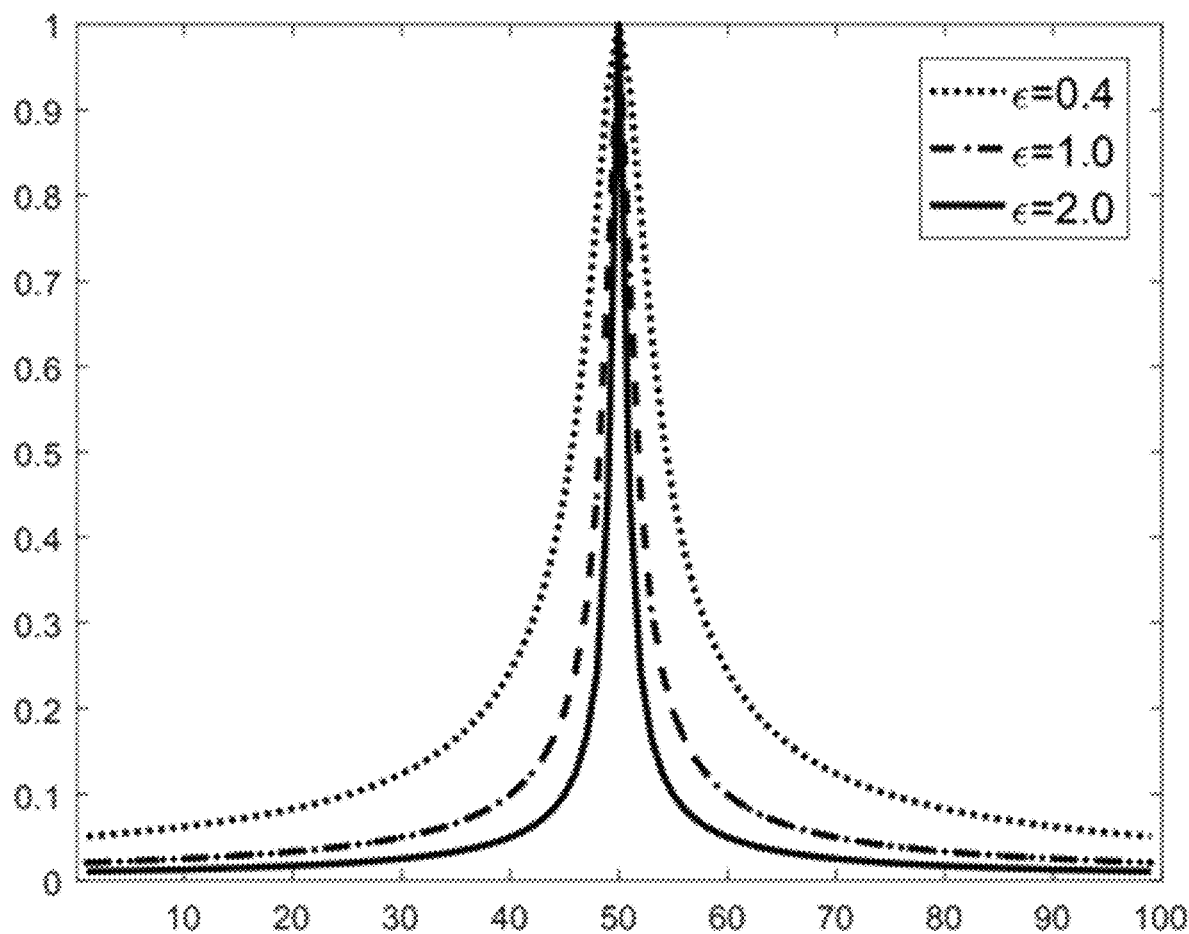
FIG. 3 illustrates the influence of different values of parameter $\varepsilon$ on the shape of the MQ function.

In view of the above-mentioned problem, correspondings study is made on Formula (1), and results are shown in FIG. 1 to FIG. 3. As can be seen from FIG. 1, the influence of c on the MQ function is reflected in two aspects. In one aspect, it may change the sharpness of the radial basis function, i.e., change the weight distribution within a domain of influence. In the other aspect, its size determines the magnitude of an extreme value of the radial basis function, and c is exponentially correlated to a maximum value.

As can be seen from FIG. 2, the influence of θ on the MQ function is reflected as integrated rise and fall. The smaller the θ, the greater all the values of the whole function. As can be seen from FIG. 3, the influence of ε on the MQ function is reflected as a change in smoothness thereof. The smaller the value of ε, the smoother the resulting radial basis function. The influence of ε is different from that of c, and the former can independently change the smoothness without affecting the magnitude of an extreme value.

The MQ function in the general form may lead to solving of an ill-conditioned equation set, and a small error in data may result in a significantly large error in an interpolation solution. To reduce this restriction, the conventional MQ function is combined with a shape parameter independent cubic kernel function to obtain the hybrid basis function. The specific form is as follows:

$$\phi(r) = \alpha(1+(\varepsilon r_I)^2)^{-0.5} + \beta r_I^3 \quad (8)$$

Figure 4:
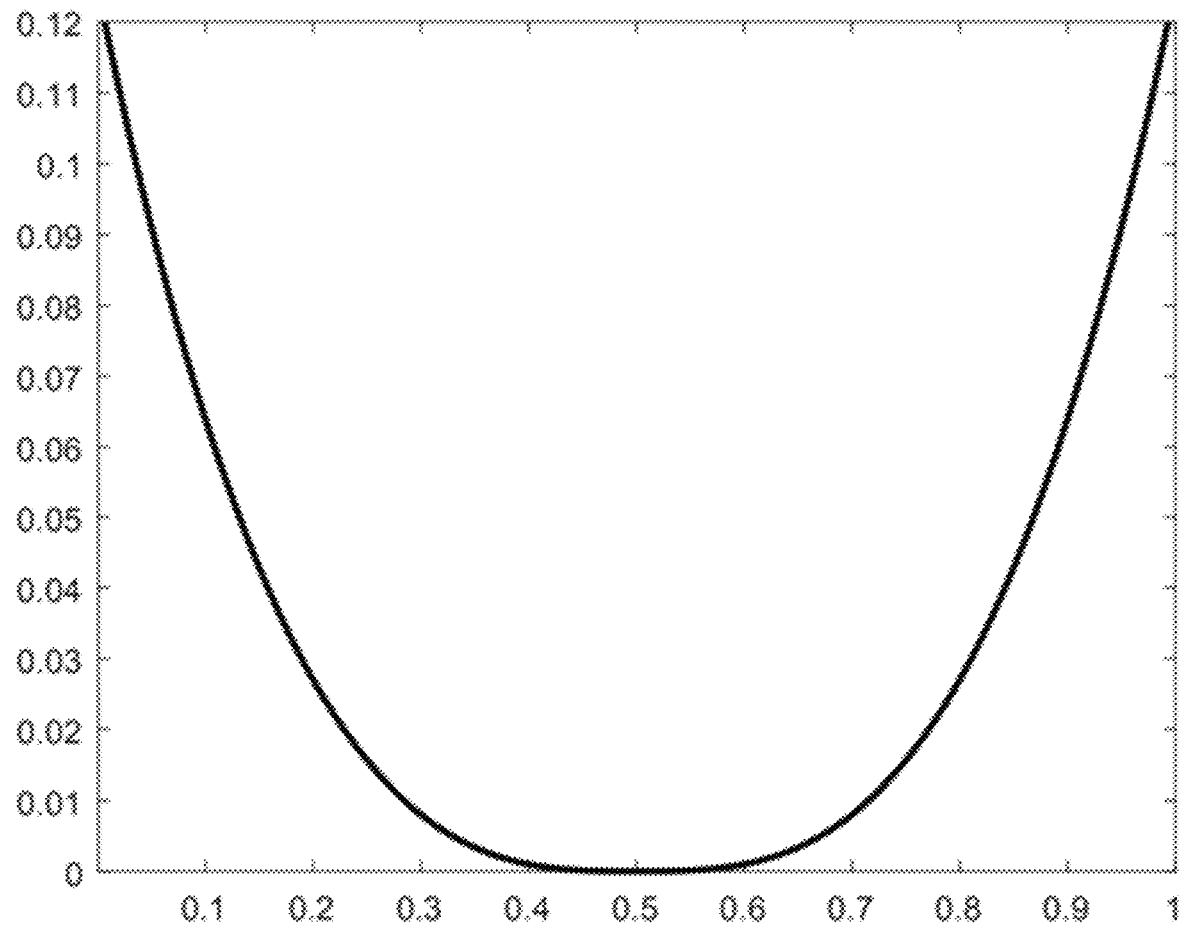
FIG. 4 is a diagram illustrating the shape of a cubic basis function.
Figure 5A:
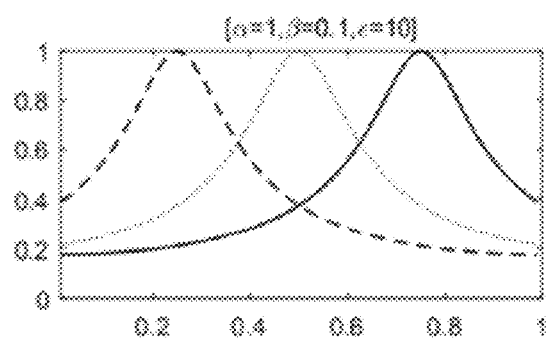
FIGS. 5A-5I are diagrams of the shape of a hybrid basis function.
Figure 5B:
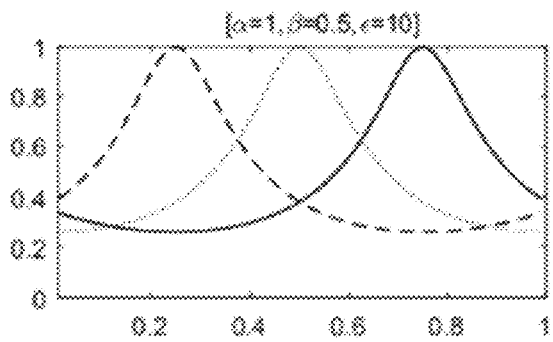
Figure 5C:
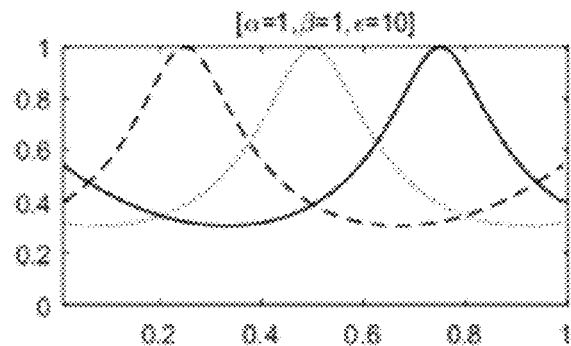
Figure 5D:
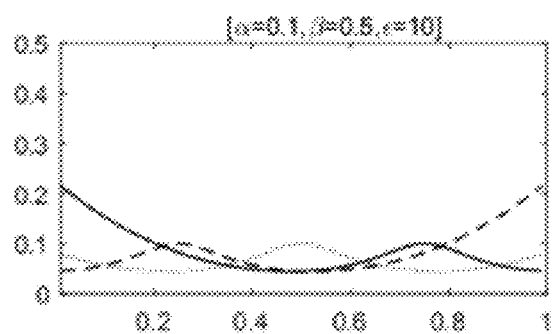
Figure 5E:
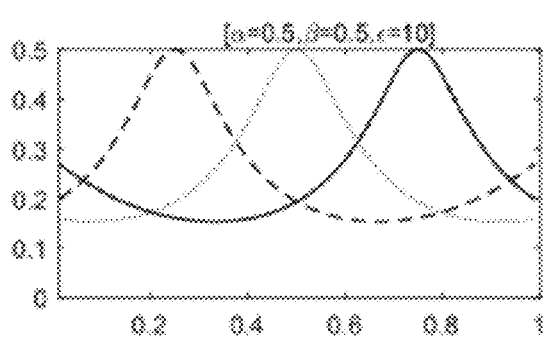
Figure 5F:
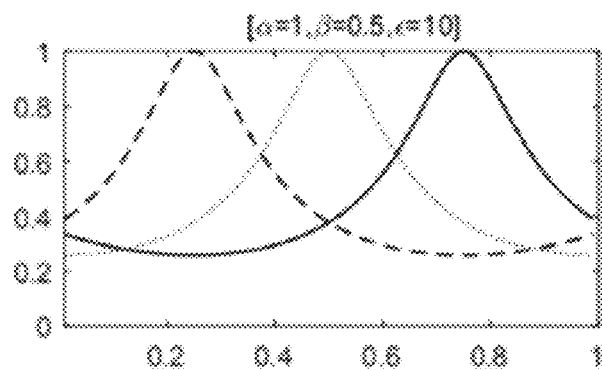
Figure 5G:
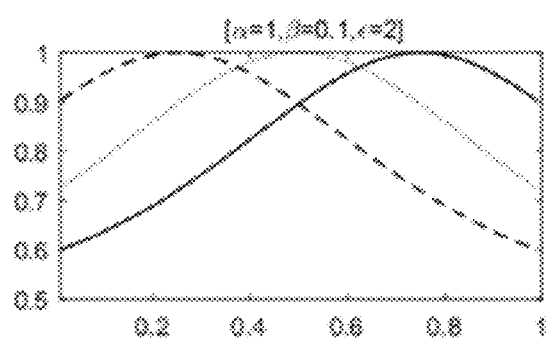
Figure 5H:
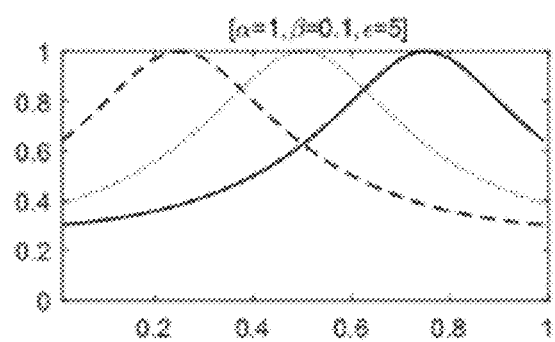
Figure 5I:
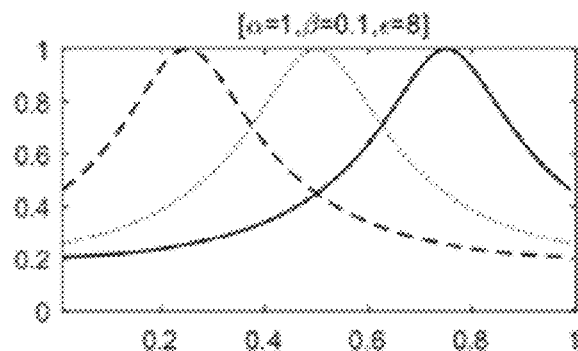

The shape of the cubic kernel function is as shown in FIG. 4. The shape of the hybrid kernel function is as shown in FIGS. 5A-5I. It can be observed in FIGS. 5A-5I that α is an extreme value that determines a component proportion of the MQ radial basis function while determining a center. B is a component that determines the cubic kernel function. ε is the same as before in nature, and the greater its value, the sharper the resulting radial basis function.

II. Evaluation Method for Parameter Selection

Both of the MQ radial basis function and the hybrid basis function have the problems of many parameters and difficult selection. For this, some parameters are introduced to evaluate whether a distance between nodes arranged and the selection of the shape parameter of the basis function are excellent.

Figure 6:
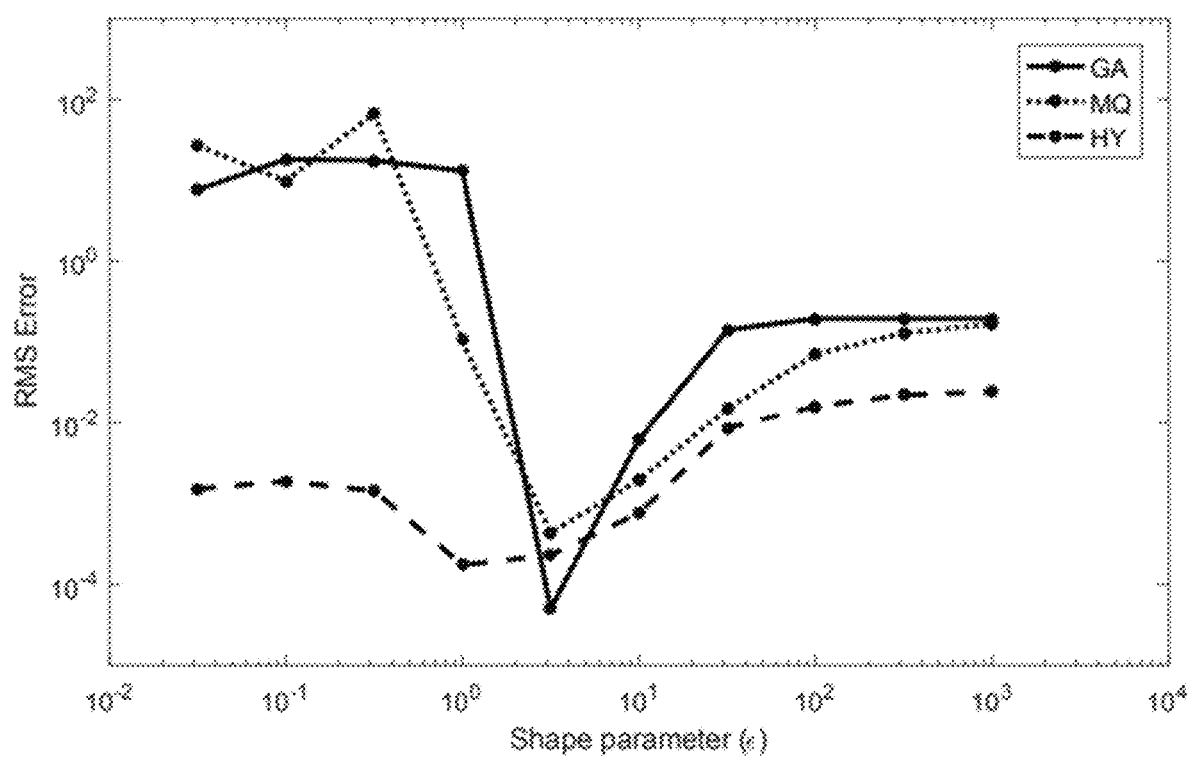
FIG. 6 is a diagram illustrating a relationship between a root-mean-square error and a shape parameter.

1. The influence of the shape parameter on the root-mean-square error: the shape parameter has a very large influence on the root-mean-square error of the solved value, and the relationship between them is shown in FIG. 6. The overall error of the hybrid basis functions used herein is significantly lower than that of conventional methods.

Figure 7:
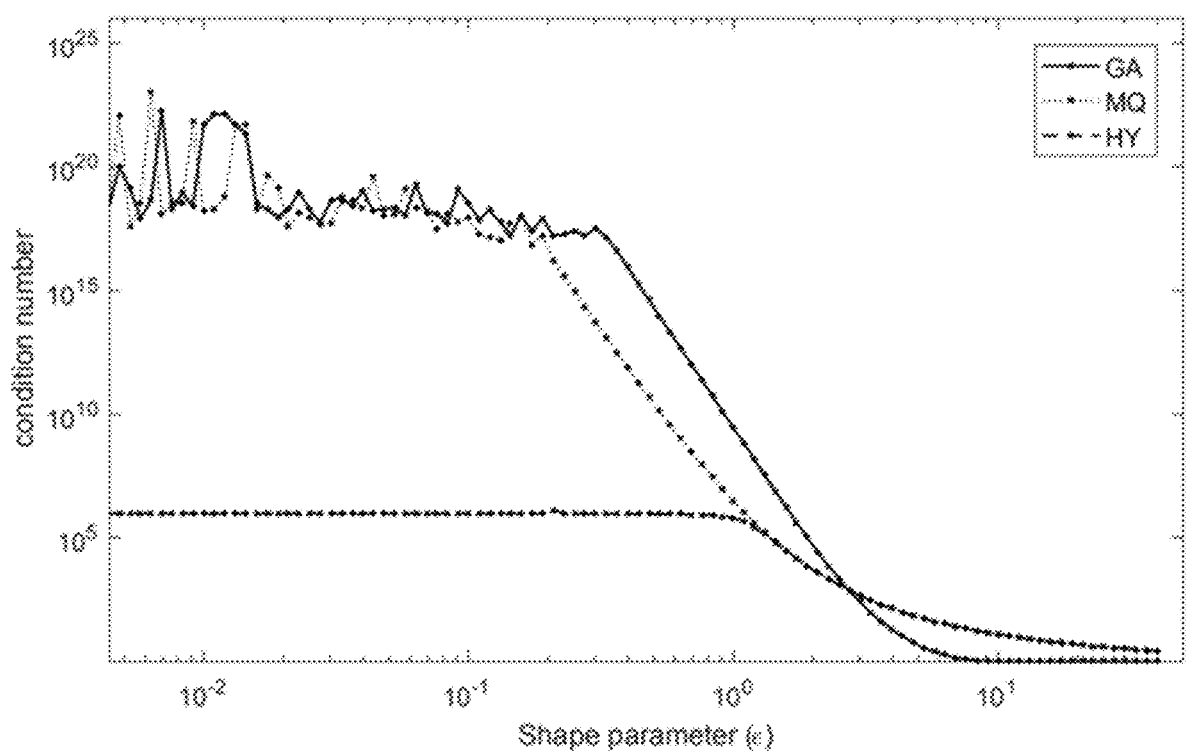
FIG. 7 is a diagram illustrating a relationship between a condition number and the shape parameter.

2. The influence of the shape parameter on the condition number: the relationship between the shape parameter ε and the condition number is shown in FIG. 7. It can be seen from the figure that the value of ε can be selected to make the root-mean-square error and the singularity of the equation smaller at the same time.

Figure 8:
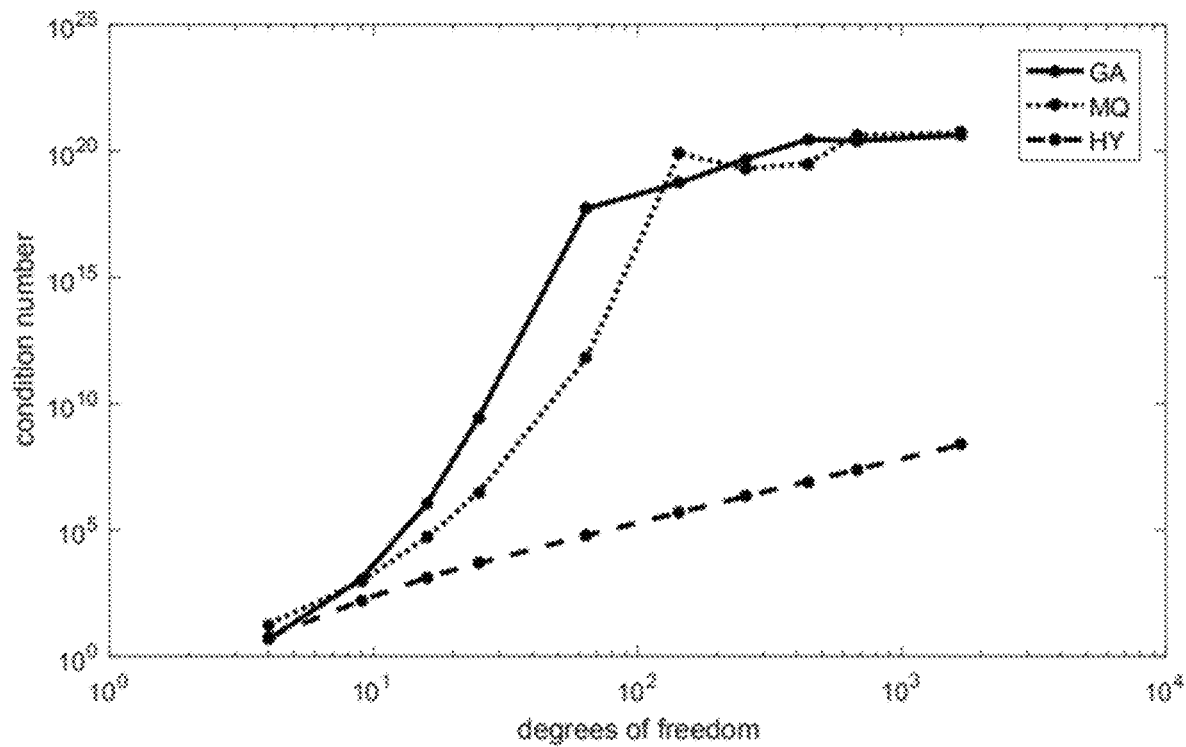
FIG. 8 is a diagram illustrating a relationship between a condition number and a degree of freedom.

3. The influence of the degree of freedom on the condition number: the relationship between the degree of freedom and the condition number is shown in FIG. 8. It can be seen from the figure that when the degree of freedom is small, the condition number increases significantly with the increase of the degree of freedom and then tends to be stable in the conventional method. The hybrid basis function is significantly better than the conventional method in terms of the influence of the degree of freedom.

Figure 9:
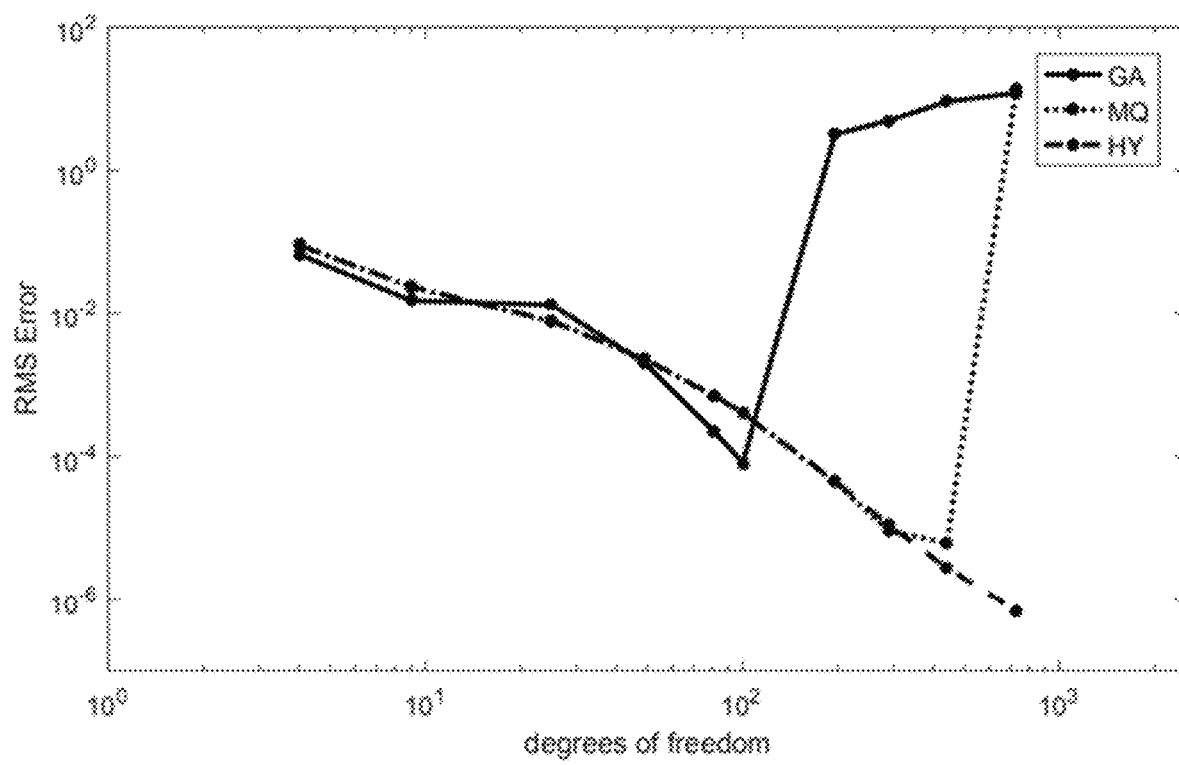
FIG. 9 is a diagram illustrating a relationship between a root-mean-square error and a degree of freedom.
Figure 10A:
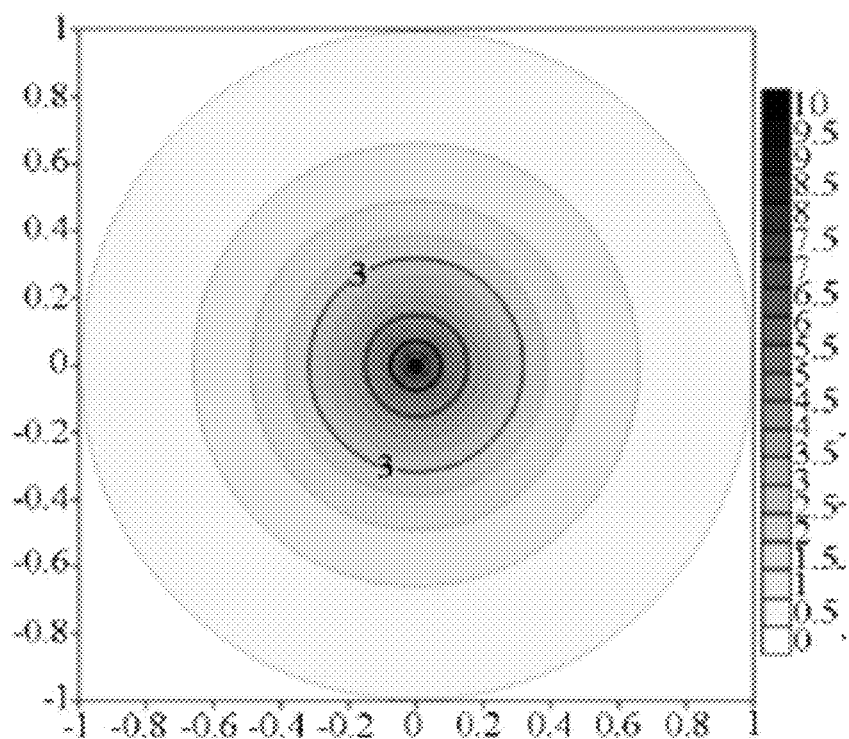
FIGS. 10A-10D are diagrams of kernel function weighting.
Figure 10B:
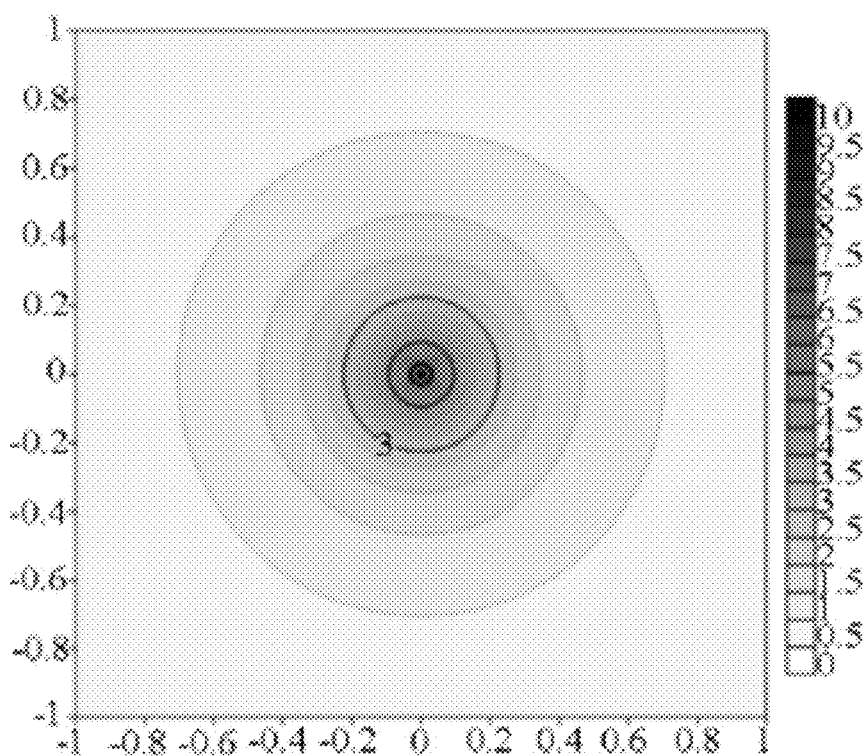
Figure 10C:
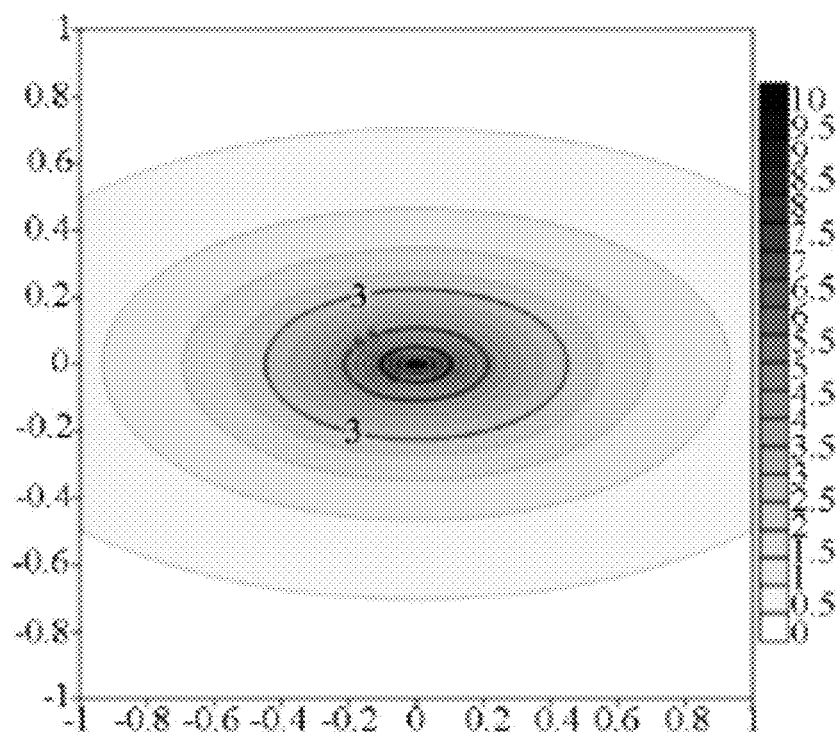
Figure 10D:
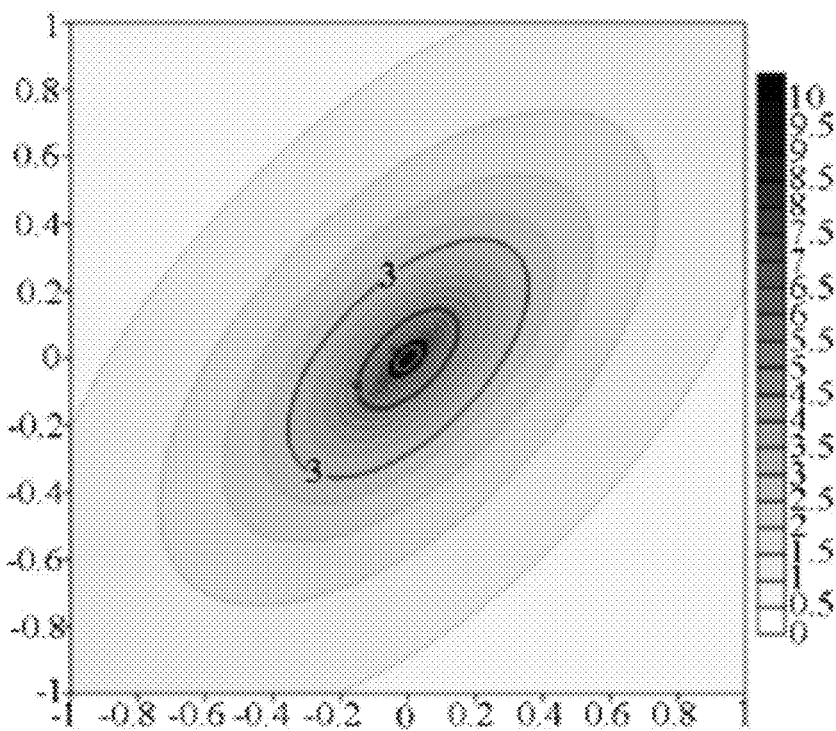

4. The influence of the influence of the degree of freedom on the root-mean-square error: the influence of the degree of freedom on the root-mean-square is shown in FIG. 9. It can be seen from the figure that when the degree of freedom is small, the root-mean-square error can decrease with the increase of the degree of freedom in the three methods. This may not occur for the improved hybrid basis function. Therefore, the hybrid basis function can better adapt to the change in the degree of freedom.

III. Selection of Construction Mode of Equation

Weighted residual method is a mathematical method that can directly obtain an approximate solution from a calculus equation, which is a powerful method for constructing approximate solutions of ordinary differential equations (ODEs) and partial differential equations (PDEs) and discrete system equations. Governing equations for the studied problem can be expressed as follows:

$$\begin{cases} L(u(x)) = f(x) & x \in \Omega \\ B(u(x)) = g(x) & x \in \Gamma \end{cases} \quad (2)$$

where L is a differential operator in a solution domain $\Omega$, while B a differential operator on a boundary $\Gamma$ and u(x) a field variable in the solution domain. According to formula (2), residual forms of the equations are obtained as follows:

$$\begin{cases} R_\Omega = L(u(x)) - f(x) = 0 & x \in \Omega \\ R_\Gamma = B(u(x)) - g(x) = 0 & x \in \Gamma \end{cases} \quad (3)$$

A residual equation in an integral form is constructed as follows:

$$\int_\Omega w R_\Omega d\Omega + \int_\Gamma v R_\Gamma d\Gamma = 0 \quad (4)$$

where w and v are weight functions. When the above formula satisfies certain conditions, such as the basis function being continuous at a certain order, and the weight function and the basis function being linearly independent, an approximate solution that converges to an exact solution can be obtained.

The used hybrid basis function generated based on the MQ radial basis function already contains the response to the distance. After reducing the proportion problem of the weight function, the equation is more flexible, and the combination with inversion becomes more feasible and efficient.

In actual underground geological bodies, especially in the field of metal mineral prospecting, ore bodies often have obvious structural features. In order to solve the above problems, a distance reweighting method is used to make the method more suitable for the prediction of underground geological ore bodies.

First, in terms of tendency, the best calculation results can be obtained when the tendency of the geological body is consistent with the tendency of the basis function. The specific form of a reweighted distance is as follows:

$$\hat{d} = |\Delta x, \Delta y| * \delta * G * R * G' |\Delta x, \Delta y|' \tag{5}$$

$$G = \begin{bmatrix} \cos\theta & \sin\theta \\ -\sin\theta & \cos\theta \end{bmatrix} \tag{6}$$

$$R = \begin{bmatrix} \rho & 0 \\ 0 & \rho^{-1} \end{bmatrix} \tag{7}$$

where $\Delta x$ and $\Delta y$ represent horizontal and vertical distances in two dimensions, respectively. $\delta$ is a scaling parameter, G represents a rotation matrix, and $\theta$ is a rotation parameter. R is a stretching matrix and $\rho$ is a stretching parameter. The specific way of influence can be seen in FIGS. 10A-10D. In summary, the scaling parameter is used to change the gradient of the basis function, while the stretching matrix is used to match the approximate morphology of the estimated ore body and the rotation matrix is used to estimate the approximate tendency of the ore body.

V. Actual Operation Process

Figure 11:
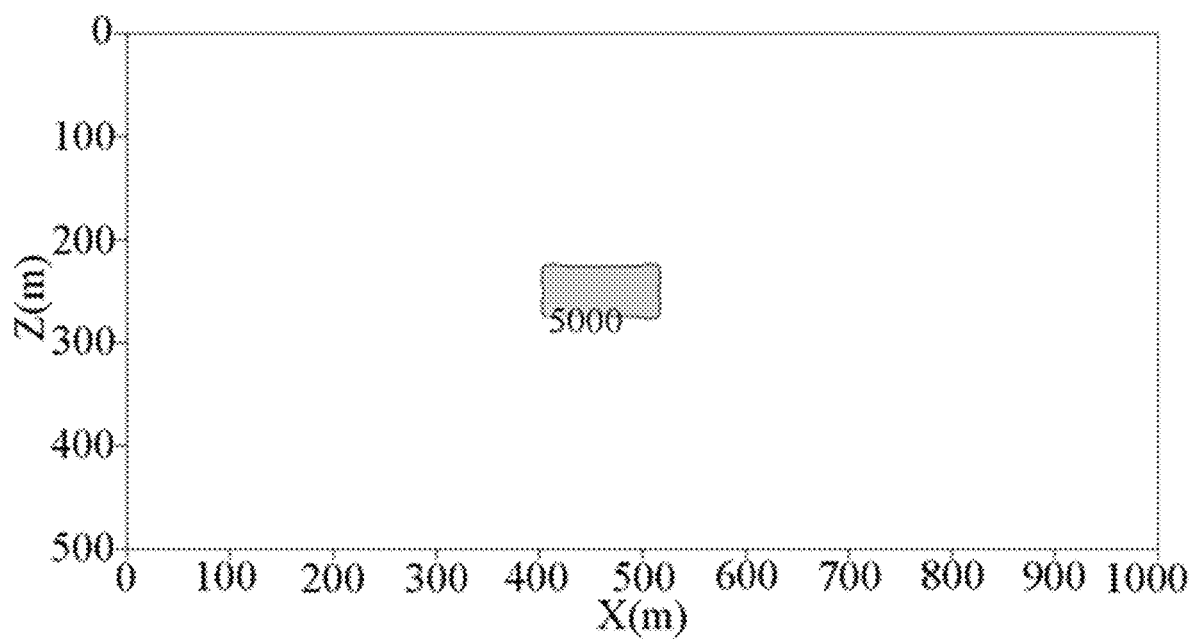
FIG. 11 is a schematic diagram of a model.

A work area with a depth of 500 meters and a width of 1000 meters is established, with a background grid spacing of 20 meters, in which a hypothetical geological ore body is established. A rectangular two-dimensional ore body with a length of 140 meters and a width of 80 meters is used herein, with a residual density of 5 g/cm³. The specific representation is shown in FIG. 11.

Figure 12:
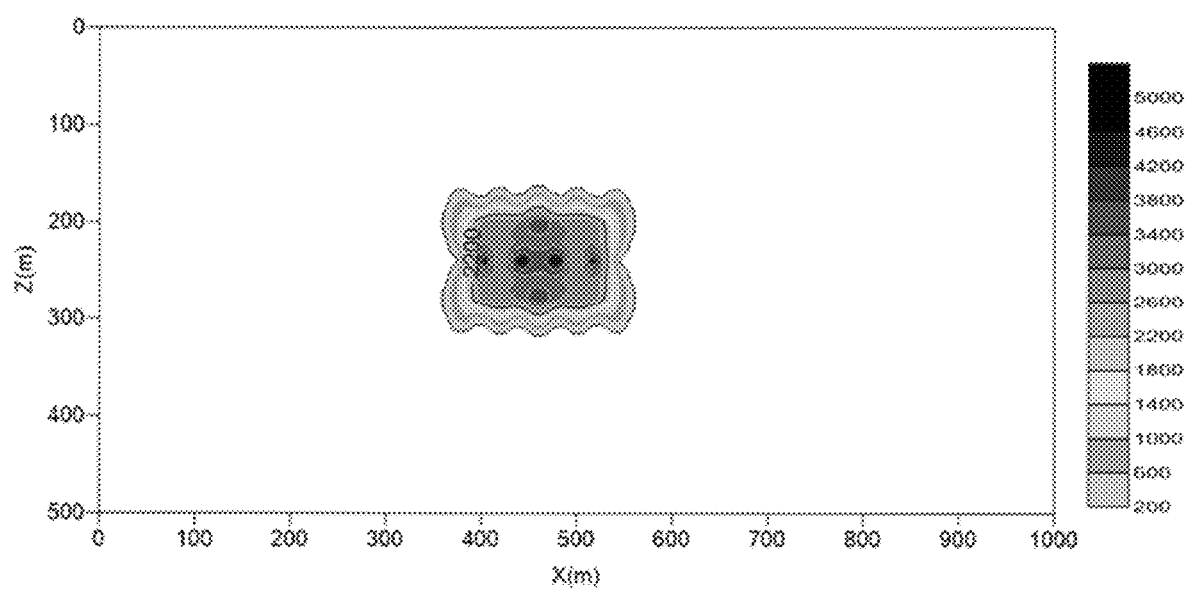
FIG. 12 is a diagram illustrating an estimation model with a meshfree method.

The gravity inversion method based on a meshfree method focuses on the rational use of prior information, and the prior information is substituted into the inversion process. Therefore, it is assumed that a certain amount of scatter density information has been obtained by methods such as well logging. Subsequently, appropriate parameters of the hybrid basis function are selected and substituted into the following equation:

$$u(X) \approx u*(X) = \sum_{i=1}^{n} R_i(X)b_i = R^T(X)b \tag{8}$$

where $R^T(X)$ is the weighted hybrid basis function, which is expressed as Formula 8, and the weighted distance is expressed as Formula (5). b is a coefficient vector. The obtained coefficient vector is substituted into the global background to obtain the estimated ore body distribution, as shown in FIG. 12. Compared with the prior constraints in the conventional method, it pays more attention to the overall grasp.

Figure 13:
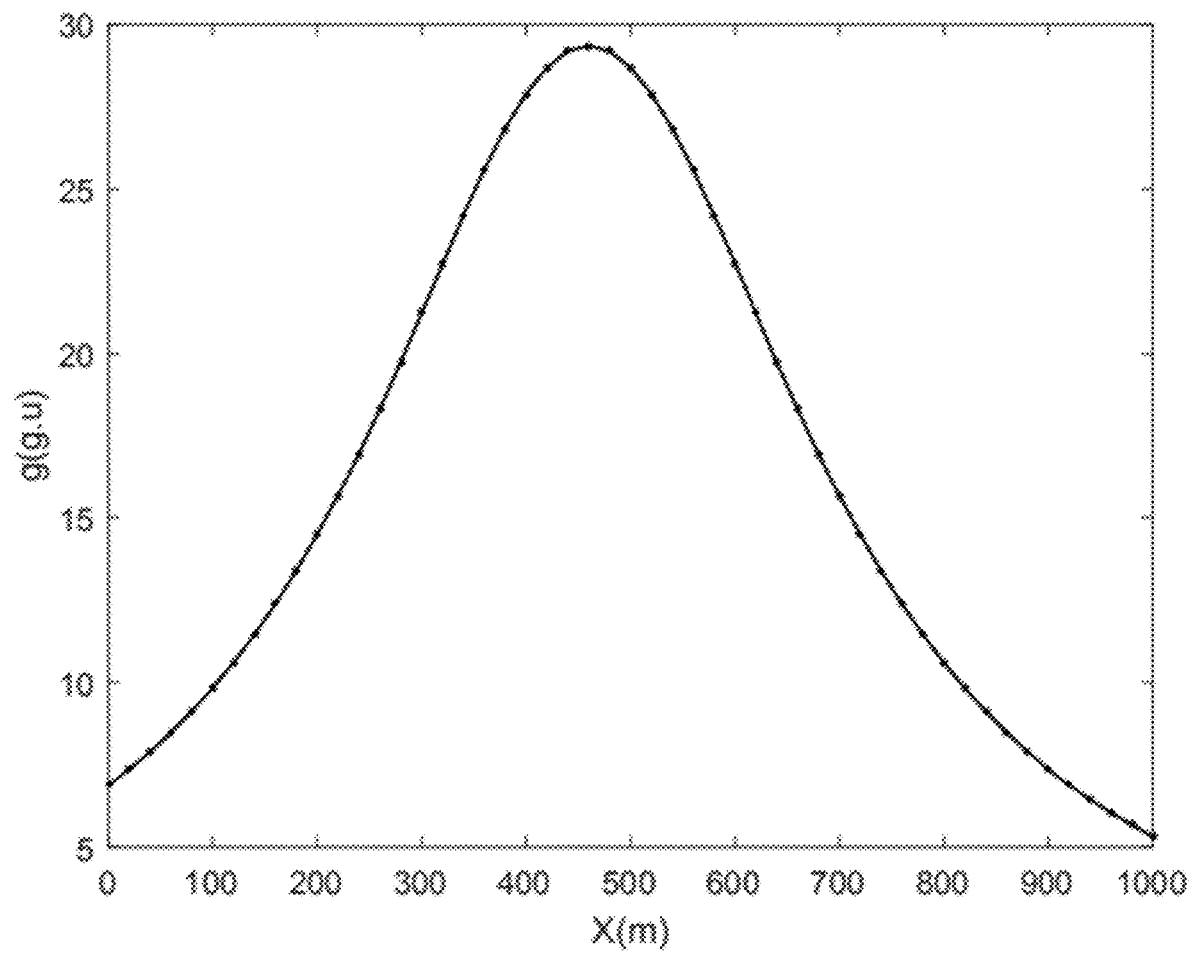
FIG. 13 is a diagram illustrating a forward modeling result.

A forward value of the model is calculated according to a forward calculation Formula, as shown in FIG. 13.

$$\Delta g = \frac{\partial v}{\partial z} = G \iiint_v \frac{\sigma(\zeta - z)d\xi d\zeta}{[(\xi - x)^2 + (\zeta - z)^2]^{3/2}} \tag{9}$$

It can be seen from the forward modeling result diagram that the forward modeling result is at the maximum when present above the ore body, and gradually decreases as it moves away from the ore body, which is in line with the basic distribution law. Meanwhile, due to a large burial depth and insufficient lateral extension of the ore body, the inversion is more difficult.

For inversion, the preconditioned conjugate gradient method (PCGM) is mainly used as the solving method. For gravity imaging inversion, the condition number of a coefficient matrix is quite large, which affects the convergence of the conjugate gradient method. To solve this problem, a preconditioned matrix is added to make it more stable. The specific form is as follows:

$$PG^TG\Delta m = PG^T\Delta d \tag{10}$$

where P is the preconditioned matrix, which is taken as the reciprocal of the square of the depth. G is a system matrix, $\Delta m$ is a model correction amount, and $\Delta d$ is observation data. The characteristic values of $PG^TG$ will be concentrated on the diagonal line, thereby improving the condition number of the equation.

The conventional inversion objective function basically satisfies Formula (11):

$$\phi(m) = \|g^{obs} - g(m)\| + \lambda_h\|Wm - H\|_2^2 + \lambda_m\tau(m) \tag{11}$$

$$\tau(m) = \sum_{i=1}^{L}\sum_{j=1}^{L}\left[(m_i - m_j)^2 + \varepsilon^2\right]^{\frac{p}{2}} \tag{12}$$

where $g^{obs}$ is an observed value, while g(m) an estimated value, W a model weighting matrix, H prior underground information, $\tau$ stable functional, and $\lambda$ a regularization parameter. In meshfree gravity inversion, it is necessary to unify the prior information and the stable functional in the same matrix composed of radial basis functions.

Figure 14:
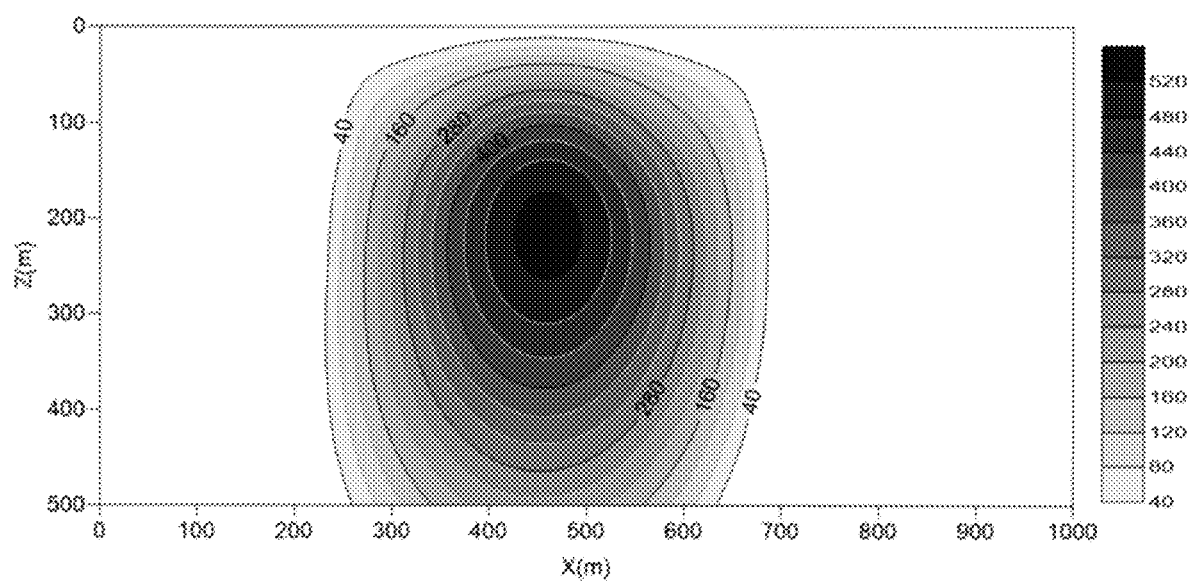
FIG. 14 is a diagram illustrating a conventional inversion result.
Figure 15:
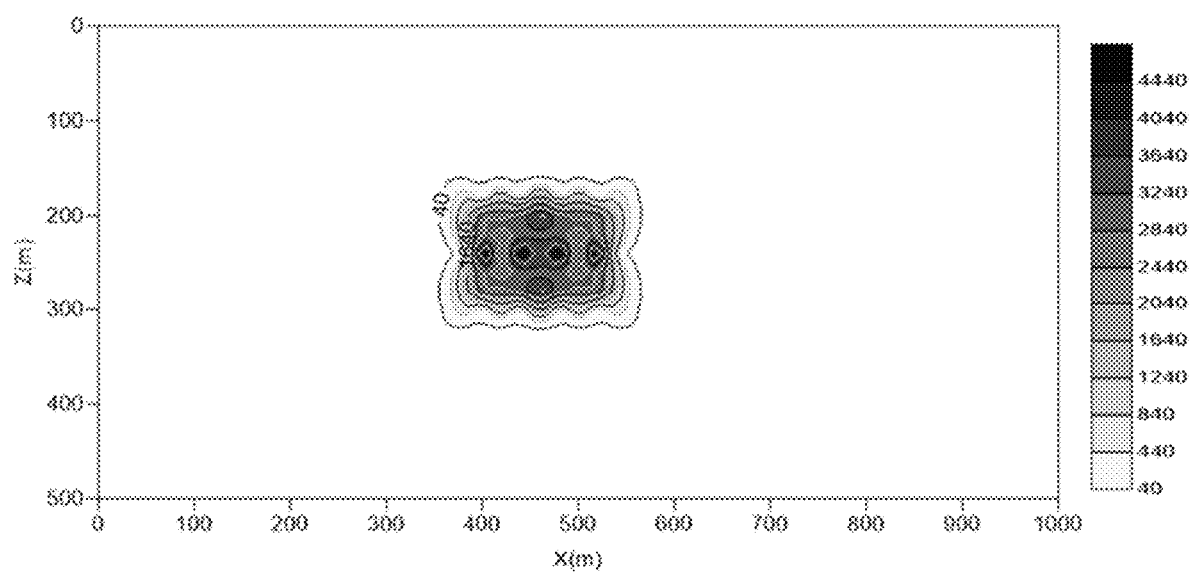
FIG. 15 is a diagram illustrating an inversion result with prior information estimation by using a meshfree method.
Figure 16:
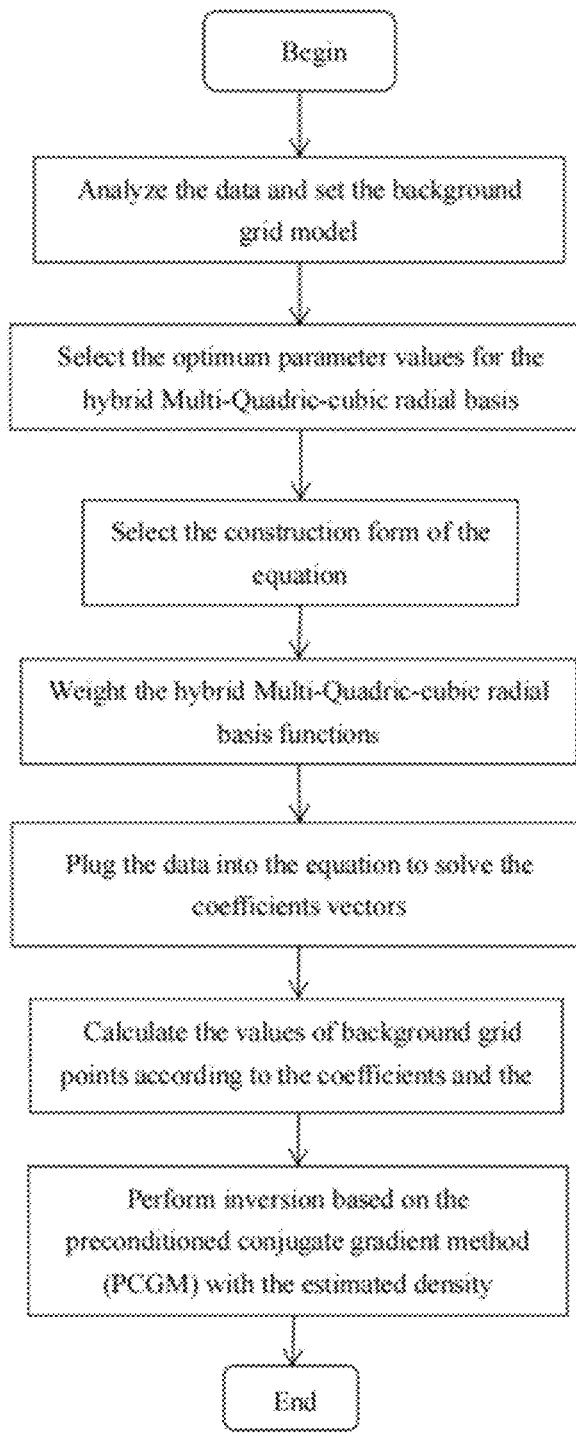
FIG. 16 is a flowchart of gravity inversion based on a meshfree method.

Comparative analysis is performed on the conventional inversion result without the prior information constraint are shown in FIG. 14 and the inversion result with prior model estimation using the meshfree method as shown in FIG. 15. It can be seen from the figures that the inversion result without the prior information will show that its center basically conforms to the position of the model, but its shape is a concentric ellipse, and its focusing ability is insufficient, resulting in the shape of the entire ore body being much bigger than the real shape. The inversion result with estimation using the meshfree method can well match the real shape of the model, and will not have the disadvantage of being too smooth.

What is claimed is:

1. A gravity inversion method based on a meshfree method that uses a hybrid basis function to estimate a density field of known prior information and an estimated density field as an initial density for inversion, the gravity inversion method comprising the following steps:

(1) selecting an appropriate method of constructing an approximate function, and forming a hybrid radial basis function by using a Multi-Quadric (MQ) radial basis function and a cubic kernel function;

(2) using an appropriate evaluation method to select suitable parameters of the hybrid radial basis function, wherein the selected parameters of the hybrid radial basis function are weights of different components and a smoothness of a component of the MQ radial basis function;

(3) selecting a construction form of an equation, wherein strong-form construction is selected if the radial basis function has a similar form to a weak-form weight function; and weighting a distance norm of the hybrid radial basis function on a basis of a tendency and morphology of an ore body in the prior information;

(4) loading, by a computer, known underground density information of an ore body to be estimated and constructing, by the computer, an equation set by using a meshfree hybrid radial basis function collocation method;

(5) solving, by the computer, the equation set, and using, by the computer, a coefficient matrix created with an acquired coefficient vector in combination with a global background grid to obtain a global estimated density distribution;

(6) loading, by the computer, observation data and performing, by the computer, inversion by using a preconditioned conjugate gradient method (PCGM) with the global estimated density distribution as a constraint to determine an underground density distribution of the ore body to be estimated; and (7) determining, by the computer, distribution of the ore body to be estimated based on the determined underground density distribution of the ore body to be estimated.

2. The method according to claim 1, wherein the meshfree hybrid radial basis function collocation method is used to achieve efficient utilization of the prior information, enabling substitution of the prior morphology and tendency of the ore body into constraints for the inversion.

3. The method according to claim 1, wherein a radial distance is used as a variable for calculating the estimated density distribution.

* * * * *